(12) United States Patent
Dhakal et al.

(10) Patent No.: US 12,675,776 B1
(45) Date of Patent: Jul. 7, 2026

(54) AUGMENTING AUTOMATION IN FACILITIES WITH ROBOTICS AND GENERATIVE ARTIFICIAL INTELLIGENCE

(71) Applicant: Schlumberger Technology Corporation, Sugar Land, TX (US)

(72) Inventors: Aakarshan Dhakal, Menlo Park, CA (US); Bernard Van Haecke, Menlo Park, CA (US); Manik Jahagirdar, Menlo Park, CA (US); Salma Benslimane, Menlo Park, CA (US); Hui Wang, Menlo Park, CA (US); Chen Lin, Menlo Park, CA (US); Nasser Ghorbani, Houston, TX (US); Celso Aguiar, Menlo Park, CA (US); Yifan Wang, Menlo Park, CA (US); Jose Celaya Galvan, Menlo Park, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/098,031

(22) Filed: Apr. 2, 2025

(51) Int. Cl.
| | |
|---|---|
| *G06Q 10/20* | (2023.01) |
| *G05D 1/648* | (2024.01) |
| *G05D 101/15* | (2024.01) |
| *G05D 105/80* | (2024.01) |
| *G05D 109/10* | (2024.01) |
| *G05D 109/20* | (2024.01) |

(Continued)

(52) U.S. Cl.
CPC ............. *G06Q 10/20* (2013.01); *G05D 1/648* (2024.01); *G05D 2101/15* (2024.01); *G05D 2105/89* (2024.01); *G05D 2109/10* (2024.01); *G05D 2109/20* (2024.01); *G05D 2111/10* (2024.01); *G05D 2111/32* (2024.01)

(58) Field of Classification Search
CPC .... G06Q 10/20; G06Q 10/06; G05B 23/0283; G05B 2219/32234; G05D 1/648; G05D 2101/15; G05D 2105/89; G05D 219/10; G05D 2109/20; G05D 2111/10; G05D 2111/32; G06N 3/0475; G06N 5/04; G06T 7/0004; G16Y 40/40
USPC ...................................... 705/305
See application file for complete search history.

(56) References Cited

U.S. PATENT DOCUMENTS

| | | | | |
|---|---|---|---|---|
| 12,140,915 B1 * | 11/2024 | McCarson | ............ | G06F 18/217 |
| 12,511,598 B1 * | 12/2025 | Shah | ................ | G06Q 10/06313 |

(Continued)

FOREIGN PATENT DOCUMENTS

| | | | | | |
|---|---|---|---|---|---|
| EP | 3989194 | * | 4/2022 | ........... | G05D 1/0094 |
| EP | 3989194 A1 | * | 4/2022 | ........... | G05D 1/0094 |

OTHER PUBLICATIONS

Rosende et al., Remote Management Architecture of UAV Fleets for Maintenance, Surveillance, and Security Tasks in Solar Power Plants, Energies 2020 13(21), 5712 (Year: 2020).*

(Continued)

*Primary Examiner* — Michael P Harrington
*Assistant Examiner* — Mark C Clare
(74) *Attorney, Agent, or Firm* — Kyle R. Miiller

(57) ABSTRACT

The present disclosure relates to systems and methods for using generative artificial intelligence in facilities. The systems and methods receive sensor data from sensors within a facility and use the sensor data to determine a context of the facility. The systems and methods generate an action in response to the context.

18 Claims, 4 Drawing Sheets

(51) Int. Cl.
    *G05D 111/10*     (2024.01)
    *G05D 111/30*     (2024.01)

(56)         References Cited

U.S. PATENT DOCUMENTS

| | | | |
|---|---|---|---|
| 2025/0110852 A1* | 4/2025 | Swanson | G06F 9/5027 |
| 2026/0050258 A1* | 2/2026 | Domakhina | G05B 23/0283 |
| 2026/0057468 A1* | 2/2026 | Shimono | G06Q 50/265 |

OTHER PUBLICATIONS

Latha et al, Enhancing Facility Safety for Autonomous Gas Inspection Drones Leveraging Convolutional Neural Networks and IoT Technology, 2024 11th Int'l Conference on Reliability, Infocom Technologies and Optimization (Trends and Future Directions) (ICRITO) (Year: 2024).*

* cited by examiner

300

Receiving, at an edge server, sensor data from sensors in a facility — 302

Determining a context of the facility in response to a generative AI model at the edge server analyzing the sensor data — 304

Generating, by the generative AI model, an action in response to the context — 306

Outputting the action — 308

AUGMENTING AUTOMATION IN FACILITIES WITH ROBOTICS AND GENERATIVE ARTIFICIAL INTELLIGENCE

BACKGROUND

Production facilities represent a dynamic setting, containing multiple equipment, operators, and processes. Production facilities typically require constant maintenance and operations. Production facilities typically include equipment that is used in a production process where health, safety, and environment (HSE) incidents may occur. Moreover, production facilities include equipment that may have risks involved in using the equipment.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some implementations relate to a method. The method includes receiving, at an edge server, sensor data from sensors in a facility. The method includes determining a context of the facility in response to a generative artificial intelligence model at the edge server analyzing the sensor data. The method includes generating, by the generative artificial intelligence model, an action in response to the context. The method includes outputting the action.

Some implementations relate to a device. The device includes a processor; memory in electronic communication with the processor; and instructions stored in the memory, the instructions being executable by the processor to: receive, at an edge server, sensor data from sensors in a facility; determine a context of the facility in response to a generative artificial intelligence model at the edge server analyzing the sensor data; generate, by the generative artificial intelligence model, an action in response to the context; and output the action.

Some implementations relate to a computer-readable storage medium including instructions that, when executed by a processor, cause the processor to: receive, at an edge server, sensor data from sensors in a facility; determine a context of the facility in response to a generative artificial intelligence model at the edge server analyzing the sensor data; generate, by the generative artificial intelligence model, an action in response to the context; and output the action.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
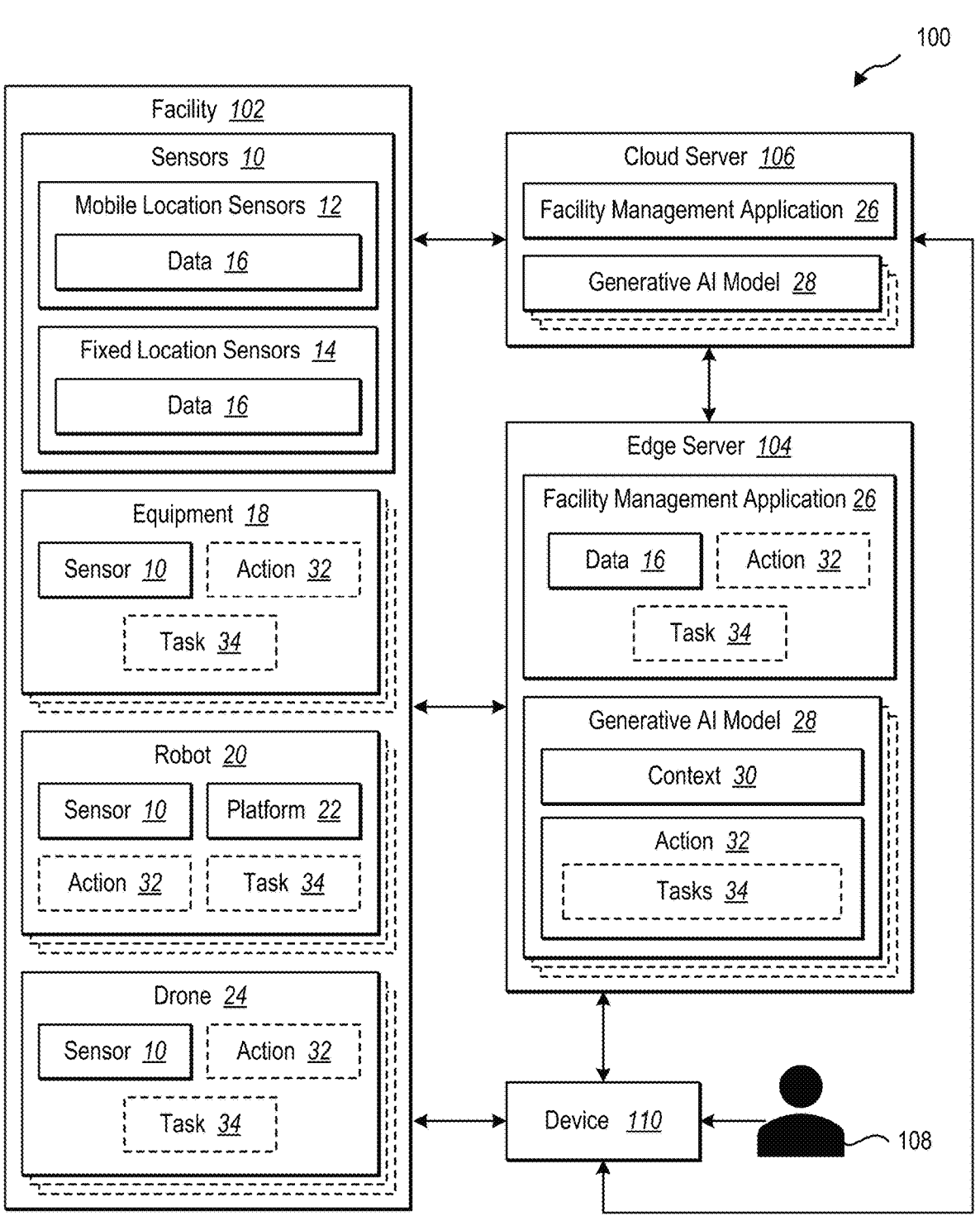
FIG. 1 illustrates an example environment with a facility in accordance with implementations of the present disclosure.

This disclosure generally relates to using generative artificial intelligence (AI) in facilities. Production facilities represent a dynamic setting, containing multiple equipment, operators, and processes. Production facilities typically require constant maintenance and operations. Production facilities typically include equipment that is used in a production process where health, safety, and environment (HSE) incidents may occur. Moreover, production facilities include equipment that may have risks involved in using the equipment. Existing solutions use sensors and robots to help minimize the risk and HSE incidents in the facilities. Existing solutions preprogram the tasks in advance for the robots in the facilities.

The present disclosure includes systems and methods providing a connected facility by augmenting the facility with robotics, edge technology, and generative AI models to draw insights from data obtained by sensors within the facility. The systems and methods use generative AI models to infer a context of the facility using the data provided by the sensors. The systems and methods use generative AI models to infer a set of actions that dynamically adapt to changes in context within the facility. The systems and methods schedule and execute the actions within the facility.

The present disclosure includes a number of practical applications that provide benefits and/or solve problems associated with using generative artificial intelligence (AI) in facilities. Examples of these applications and benefits are discussed in further detail below. One example benefit of the systems and methods of the present disclosure is creating custom configurations at the edge making edge deployments efficient and fast, saving resources and time. The systems and methods implement an end-to-end automation at the edge (from provisioning resources, to storing, fusing, and retrieving sensor data, to dynamically running AI tasks).

One technical advantage of the systems and methods of the present disclosure is resiliency capabilities for robotic platforms. The systems and methods provide availability, scaling, and failover of robotic platforms. The systems and methods accommodate dynamic workload volume and accommodates a handover when a failure occurs in the hardware or software of a robot. The systems and methods provide dynamic software modules installation, discovery and updates on robots. Another technical advantage of the systems and methods of the present disclosure is real time adaptation of robots. The systems and methods provide real-time demand adaptation and on the fly updates of software modules of robots. The systems and methods quickly adapt to situations in the facilities.

Another technical advantage of the systems and methods of the present disclosure is edge deployments, saving resources and time. The systems and methods provide a low code solution for creating custom configurations at the edge for the facilities from setting up hardware resources to running advanced analytics and reasoning processing data streams from the sensors at the facilities.

One example use of the systems and methods of the present disclosure is autonomous inspections using robots in a facility. Robotic inspections heavily rely on high streaming data rates. The systems and methods use edge workflows processed by generative AI models at the edge providing the flexibility to adapt to changes in the environment of the facility and provide robotic commands to the robots in the facility instructing the robots for performing the inspections in the facility. For example, a robotic inspection routine triggers an alarm due to a pressure drop seen on a gauge on a pipeline connected to the exit of a compressor, but the root cause is in fact discovered upstream (e.g., input) from the compressor after instructing the robot to search for and check all gauges in the vicinity of the compressor.

Another example use of the systems and methods of the present disclosure is robotic-assisted inspection operations. For example, a sensor detects hydrogen sulfide (H2S) gas concentration above normal, and the methods and systems re-route a robot path instructing a robot to search for the cause, likely a leak, by moving in an appropriate manner to map the gas concentration taking into account the direction of the wind. The methods and systems interpret the scene while the robot is moving in case anything else looks suspicious such as temperature hotspots or structural integrity issues, such as, bent pipes or broken pipes.

Another example use of the systems and methods of the present disclosure is robotic-assisted thermal camera inspection operations in response to a loud noise coming from a big gas compressor to see if friction or lack of lubricant might be the cause of the sound but discover that the sound is in fact more likely made by human workers operating a loud machine.

Another example use of the systems and methods of the present disclosure is interpreting a scene anomaly arising in the middle of a predetermined route of a robot (e.g., during an inspection operation of the robot) because of an unforeseen or unexpected obstacle in the route, turning out to be a maintenance truck surrounded by a crew of workers working overtime.

Another example use of the systems and methods of the present disclosure is detecting a sudden large cloud of black smoke in some area preventing use of a regular RGB camera and LIDAR (e.g., during an inspection operation of a robot), requiring re-routing a drone over to the area with black smoke to inspect the equipment supposed to be in this area.

Another example use of the systems and methods of the present disclosure is generating a human-readable inspection report illustrated with pictures, for the different inspection operations, including references to historical cases, if any, and recommendations for scheduling maintenance.

The systems and methods provide flexibility in deploying autonomous robotic solutions that require scaling. The hardware resources used in the systems and methods can be removed, added, and discovered dynamically without having to rewrite the applications used with the systems and methods. Users can use the systems and methods to design, develop, and deploy robotic applications requiring dynamic scaling capabilities in a more modular way, without dealing with hardware resource management to accommodate resiliency and scaling.

Referring now to FIG. 1, illustrated is an example environment 100 with a facility 102. The facility 102 includes a plurality of sensors 10. The sensors 10 gather information about an environment of the facility 102 and provide data 16 of the information collected. The environment of the facility 102 includes equipment 18, compute devices, mobile robots 20, drones 24, such as an airborne drone in the following examples, wired and/or wireless networks, actuators, interfaces with control systems of the facility 102, and interfaces with backend systems of the facility 102.

In some implementations, the facility 102 includes hundreds of sensors 10. In some implementations, the facility 102 includes thousands of sensors 10. One example of the facility 102 is a production facility in the oil and gas industry. Another example of the facility 102 is an underwater facility used in the oil and gas industry. Another example of the facility 102 is a storage area for machinery used in the oil and gas industry.

In some implementations, the sensors 10 include mobile location sensors 12 (e.g., sensors that move locations or positions). One example of a mobile location sensor 12 is a sensor on a platform 22 of a robot 20 that moves throughout the facility 102 or moves in an area surrounding the facility 102. The mobile location sensors 12 capture a scene in real-time. For example, the mobile location sensors 12 capture video or images of a scene as the robot 20 is moving through the scene. Another example of a mobile location sensor 12 is a sensor on a drone 24 that flies within the facility 102 or flies nearby the facility 102. In some implementations, the mobile location sensors 12 interpret a scene nearby the robot 20 or the drone 24 in real-time as the robot 20 or the drone 24 moves locations.

In some implementations, the sensors 10 include fixed location sensors 14 (e.g., sensors that remain at a position or location). In some implementations, the sensors 10 are multimodal sensors supporting multimodal data 16 (e.g., audio, video, images, text, temperature, or timeseries data). One example of a data 16 includes visual, high-definition video. Another example of data 16 includes thermal pictures, thermal timeseries. Another example of a data 16 includes spatial, LIDAR, RADAR, ultrasound imaging. Another example of data 16 includes vibration imaging, vibration timeseries. Another example of data 16 includes gas leakage. Another example of data 16 includes sound level and frequency. Another example of data 16 includes surface corrosion. Another example of data 16 includes liquid leakage. Another example of data 16 includes pressure telemetry.

The facility 102 is in communication with distributed compute elements, such as, the sensors 10 (the mobile location sensors 12 and fixed location sensors 14), an edge server 104 located near the facility 102 and a cloud server 106 located remote from the facility 102. The edge server 104 provides compute capabilities nearby the facility 102. In some implementations, the facility 102 is in communication with the edge server 104 and the cloud server 106 through network connectivity. In some implementations, the facility 102 is in communication with the edge server 104 through a private network connectivity (e.g., 5G connectivity) and is in communication with the cloud server 106 through network connectivity.

In some implementations, the facility 102 communicates with the edge server 104 to enable fast and efficient responses to the data 16 obtained by the sensors 10. In one example, internet connectivity may be weak or intermittent at the facility 102 and the facility 102 communicates with the edge server 104 through a private network connectivity instead of communicating with the cloud server 106 through the weak or intermittent network connectivity.

In some implementations, the facility 102 communicates with the edge server 104 to preserve privacy of the data 16 obtained by the sensors 10. For example, regulations or laws of a country where the facility 102 is located may prevent the data 16 from leaving the country. In one example, the edge server 104 is located in a same country as the facility 102 and the cloud server 106 is located in a different country from the facility 102 and the facility 102 communicates with the edge server 104 to comply with the regulations or laws of the country.

In some implementations, the edge server 104 includes a facility management application 26 that receives the data 16 from the sensors 10 in the facility 102 and aids the user 108 in managing the facility 102. In some implementations, the facility management application 26 is on the edge server 104 accessed through a network. In some implementations, the facility management application 26 in on the edge server 104 and the cloud server 106 accessed through a network. For example, the facility management application 26 is hosted on virtual machines in the cloud. In some implementations, a user 108 accesses the facility management application 26 using a device 110. For example, a uniform resource locator (URL) configured to an end point of the facility management application 26 is provided to the device 110 that the user 108 may access using a browser on the device 110 through the network. The network may include one or multiple networks and may use one or more communication platforms and/or technologies suitable for transmitting data. The network may refer to any data link that enables transport of electronic data between devices of the environment 100. The network may refer to a hardwired network, a wireless network, or a combination of a hardwired network and a wireless network. In one or more implementations, the network includes the internet. The network may be configured to facilitate communication between the various computing devices via well-site information transfer standard markup language (WITSML) or similar protocol, or any other protocol or form of communication. Another example includes an application on the device 110 provides the user 108 with access to the facility management application 26.

In some implementations, the facility management application 26 provides the data 16 to a generative AI model 28. In some implementations, the facility management application 26 provides the data 16 to a plurality of generative AI models 28. The generative AI model 28 receives the data 16 from the sensors 10 and interprets a context 30 of the facility 102 by analyzing the data 16 and any domain knowledge. In some implementations, the generative AI model 28 interprets the data 16 in response to a prompt instructing the generative AI model 28 to infer the context 30 of the facility.

One example of the generative AI model 28 includes foundation models. Other examples of the generative AI model 28 include large language models that understand text, large visual models that understand images and videos, and large timeseries models that understand trends in timeseries data. Another example of the generative AI model 28 includes Generative Pre-trained Transformer (GPT) models (e.g., GPT-3 or GPT-4), LlaMA, and GEMINI. Another example of the generative AI model 28 includes text-to-image models, such as, DALL-E. The generative AI model 28 generates content, such as text, images, video, audio, or other data in response to a question or prompt. Another example of the generative AI model 28 includes multi-modal models capable of receiving multimodal inputs. In some implementations, the question or prompt is multi-modal input, and the generative AI model 28 processes the multi-modal input to generate content. For example, the generative AI model 28 receives non-text input and generates an output of text. Another example includes the generative AI model 28 receives text input and generates a non-text output. The generative AI model 28 learns the patterns and structure of the input training data and generate new data that has similar characteristics to the input data in response to prompts. In some implementations, retrieval augmented generation (RAG) is used to enrich and constrain the output of the generative AI model 28 to increase the relevancy and accuracy of the output to the domain in question (e.g., the oil and gas industry).

In some implementations, the generative AI model 28 determines a context change in the facility 102 in response to analyzing the data 16 from the sensors 10. One example of a context change includes physical differences appearing over time, such as, the addition, removal, upgrade, downgrade, damage, repair, malfunction, or displacement of hardware (e.g., equipment, connecting pipes, and wiring) in the facility 102. Another example of a context change is a hazardous condition. Another example of a context change is an emergency situation. Another example of a context change is an anomaly in the facility 102. An anomaly is anything unexpected or different in the facility 102. An anomaly is any condition that may cause hazards to the equipment 18, processes, or individuals within the facility 102. For example, an anomaly in or around the equipment 18. Another example of an anomaly is structural integrity issues of the equipment 18.

The generative AI model 28 is trained with datasets related to the equipment 18, operating procedures, functioning and malfunctioning states, standard historical timeseries, and physical models of the facility 102 to infer the context 30 of the facility 102. The training datasets are expressed in the different modalities of the data 16 obtained by the sensors 10 in the facility 102 as well as plain text documentation.

The generative AI model 28 discovers the context 30 of the facility 102 and adapts to the context 30. In some implementations, sensor fusion occurs by the generative AI model 28 receiving multimodal input from the mobile location sensors 12 in the facility 102. In some implementations, sensor fusion occurs by the generative AI model 28 receiving multimodal input from the fixed location sensors 14 in the facility 102. In some implementations, sensor fusion occurs by the generative AI model 28 receiving multimodal input from the mobile location sensors 12 and the fixed location sensors 14 in the facility 102.

In some implementations, the generative AI model 28 infers an action 32 to take in response to the context 30. For example, the generative AI model 28 maps the context 30 to policies relevant to the context 30 and trigger an action 32 in response to the context 30. The generative AI model 28 may discover and adapt to unpredicted events happening in the facility 102 by processing the data 16 received from the sensors 10 in the facility 102 and inferring an action 32 to take in response to the information provided in the data 16.

In some implementations, the action 32 consists of a combination of predictable, hardcoded policies, algorithms, and programs, and less predictable trained model outputs. In some implementations, the generative AI model 28 ensures the action 32 and the tasks 34 comply with safety, process, and legal requirements by enforcing hardcoded policies when generating the actions 32 and tasks 34.

In some implementations, the action 32 includes tasks 34 used to trigger discrete functions implemented as distributed edge services and consists of logic to perform the discrete functions. In some implementations, execution of compute processes required by specific tasks 34 (e.g., a sequencing of actions 32) requires on-the-fly resource reservation, which may include dynamic spawning of services (aka nodes) on heterogeneous hardware (edge compute) either fixed, mobile or both. For example, the hardware orchestration and execution are done at the edge server 104 using distributed compute and workload orchestration tools and service mesh implementations. Hardware and software resources on the distributed computing environment provide resiliency, accommodate load, reliability, and scalability, and are configured to scale with demand.

One example of an action 32 is controlling a robot platform 22 to cause the robot 20 to move in response to instructions (e.g., change a direction of travel of the robot 20 or cause the robot 20 to perform a closeup inspection of an item in the facility 102). For example, the robot platform 22 consists of ground, air, or underwater devices. Another example includes the robot platform 22 consists in any combination of ground, air, and underwater devices. For example, the action 32 includes tasks 34 with robotic navigation commands. Another example includes tasks 34 with payload commands involving sensors for the robot platform 22.

Another example of an action 32 is controlling equipment 18 in the facility 102. For example, the action 32 provides instructions to the equipment 18 to change a setting or perform an emergency shut down. For example, the action 32 includes tasks 34 with equipment commands via remote control.

Another example of an action 32 is performing root cause analysis for a context change. For example, the action 32 includes tasks 34 to provide an illustrated summary and reporting of the root cause of the context change. Another example includes tasks 34 to provide a recommendation for addressing the context change.

The facility management application 26 receives the context 30, the action 32, and any tasks 34 from the generative AI model 28. In some implementations, the facility management application 26 provides the action 32 to the equipment 18 at the facility 102 instructing the equipment 18 to perform the action 32. In some implementations, the facility management application 26 provides the action 32 and the tasks 34 to a robot 20 in the facility 102 instructing the robot 20 to perform the action 32 and the tasks 34. In some implementations, the facility management application 26 provides the action 32 and the tasks 34 to a robot 20 and a drone 24 in the facility 102 instructing the robot 20 and the drone 24 to perform the action 32 and the tasks 34. In some implementations, the facility management application 26 provides the action 32 to a plurality of robots 20 and equipment 18 in the facility 102 instructing the robots 20 and equipment 18 to perform the action 32.

The facility management application 26 uses the generative AI model 28 to infer actions 32 to take in the facility 102 in response to the context 30 determined from analyzing the data 16 from the sensors 10 in the facility 102. In some implementations, the facility management application 26 schedules and executes the actions 32 on the fly as needed in response to the context 30.

In some implementations, the facility management application 26 presents the context 30 and the action 32 on a user interface of the device 110. The user 108 is able to view the context 30 and the action 32 generated by the generative AI model 28. For example, a report or summary of the context 30 and recommended actions 32 is presented on the user interface. The user 108 may take one or more actions to implement the actions 32 in the facility 102.

In some implementations, one or more computing devices (e.g., servers and/or devices) are used to perform the processing of the environments 100. The one or more computing devices may include, but are not limited to, server devices, cloud virtual machines, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. Moreover, in some implementations, one or more subcomponent of the feature and functionalities discussed herein may be implemented and processed on different server devices of the same or different cloud computing networks. In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
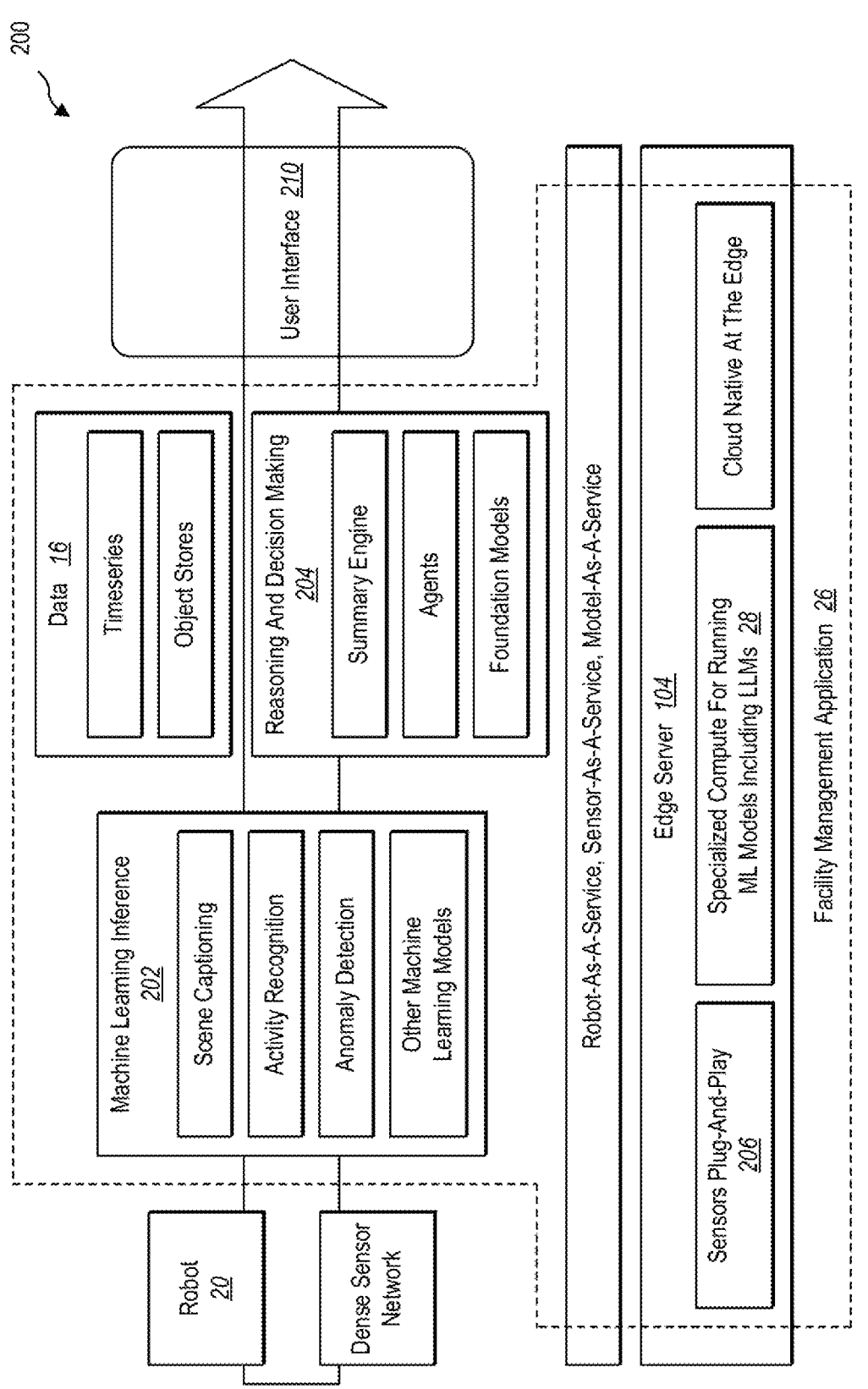
FIG. 2 illustrates an example architecture of a facility management application on an edge server in accordance with implementations of the present disclosure.

FIG. 2 illustrates an example architecture 200 of the facility management application 26 on an edge server 104. In some implementations, the facility management application 26 uses a plurality of generative AI models 28 to analyze the data 16 obtained by the sensors 10 (FIG. 1) in a facility 102 (FIG. 1). For example, the data 16 is obtained from mobile location sensors 12 (FIG. 1) on a robot 20 in the facility 102. In some implementations, the data 16 includes timeseries data. In some implementations, the data 16 includes object stores.

In some implementations, the edge server 104 includes a sensor plug and play 206 allowing dynamic software module installation, discovery, and updates. For example, the sensor plug and play 206 is used for providing hardware resource management of the robots 20 (FIG. 1) updating software modules of the robots 20. The sensor plug and play 206 provides on the fly updates to the robots 20. In another example, the sensor plug and play 206 allows the discovery of the sensors 10 in the facility. As sensors 10 are added to the facility 102, the sensor plug and play 206 allows the generative AI models 28 and other applications access to the data 16 obtained from the new sensors 10. The sensor plug and play 206 facilitates a connected facility 102 by providing dynamic discovery and updates of the sensors 10 in the facility 102.

In some implementations, the facility management application 26 uses the generative AI models 28 to perform machine learning inference 202 on the data 16. Examples of machine learning inference 202 includes scene captioning, and activity recognition, anomaly detection. The generative AI models 28 use the machine learning inference 202 to understand a scene in the facility 102. For example, the generative AI models 28 receive a video feed from a mobile location sensor 12 on a robot 20 capturing a scene in the facility 102 and perform machine learning inference 202 on the video feed to determine a context 30 (FIG. 1) of the facility 102 using the video feed (e.g., what type of equipment 18 (FIG. 1) is located nearby the robot 20 or a substance being sprayed nearby the robot 20).

In some implementations, the facility management application 26 uses the generative AI models 28 to perform reasoning and decision making 204. One example use of the architecture 200 is the robot 20 is performing a predetermined inspection routine in the facility 102 and detects with a mobile location sensor 12 on the robot 20 a gas measurement (the data 16). The generative AI models 28 receive the gas measurement from the mobile location sensor 12 on the robot 20 and perform machine learning inference 202 on the gas measurement identifying that the gas measurement exceeds a threshold. The generative AI models 28 perform reasoning and decision making 204 on the gas measurement exceeding the threshold and determine that a leak is occurring in the facility 102. The generative AI models 28 trigger an action 32 (FIG. 1) with instructions for the robot 20 to identify a source of the gas leak. The robot 20 modifies the inspection routine to locate the source of the gas leak in response to receiving the instructions in the action 32.

In implementations, the facility application 26 presents recommendations or information determined in response to the reasoning and decision making 204 on a user interface 210 (e.g., on the device 110 (FIG. 1) of the user 108 (FIG. 1)). One example includes the actions 32 recommended by the generative AI models 28. In some implementations, the user 108 provides approval for the actions 32 prior to implementation of the actions 32. Another example includes a report or summary generated by the generative AI models 28 of the context 30 inferred in response to the machine learning inference 202 and the reasoning and decision making 204.

Figure 3:
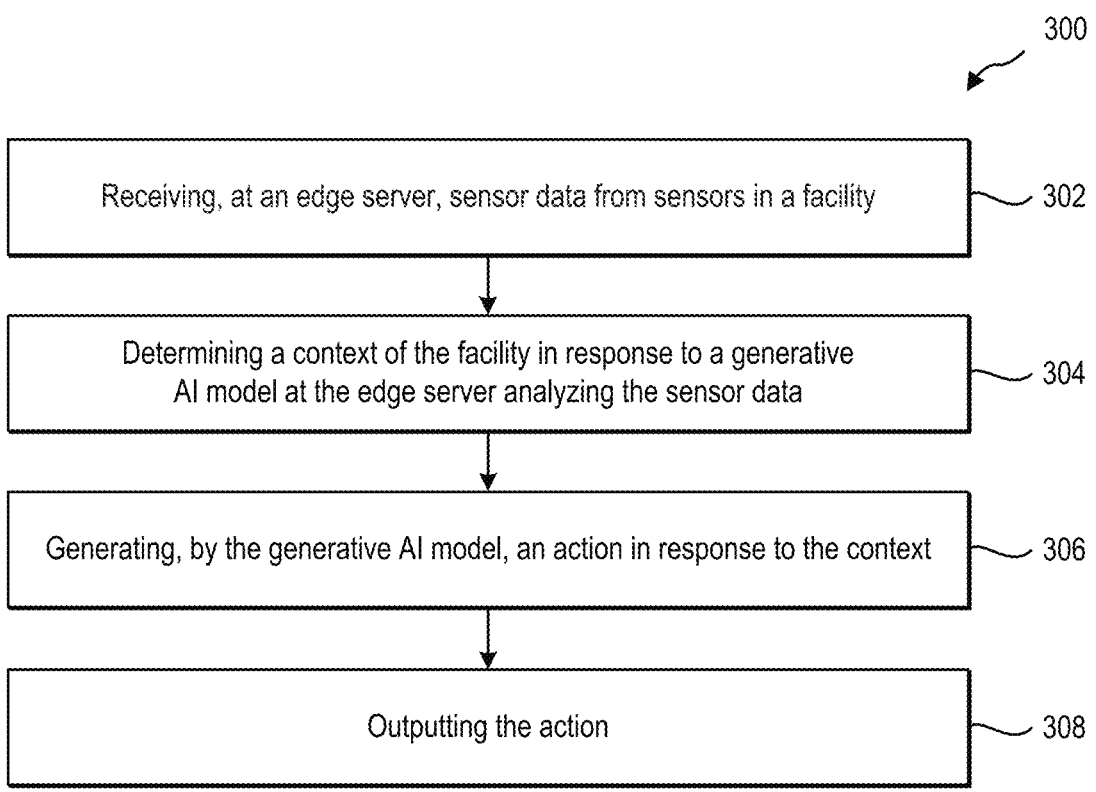
FIG. 3 illustrates an example method for facility management in accordance with implementations of the present disclosure.

FIG. 3 illustrates an example method 300 for facility management. The actions of the method 300 are discussed below in reference to FIGS. 1 and 2.

At 302, the method 300 includes receiving, at an edge server, sensor data from sensors in a facility. The facility management application 26 receives at the edge server 104 sensor data 16 from sensors 10 in the facility 102. In some implementations, the sensor data 16 is multimodal data obtained from mobile location sensors 12 and fixed location sensors 14 in the facility 102. For example, the mobile location sensors 12 are located on robots 20 and drones 24 associated with the facility 102 (e.g., robots 20 or drones 24 located within the facility 102 or operating nearby the facility 102).

At 304, the method 300 includes determining a context of the facility in response to a generative AI model at the edge server analyzing the sensor data. In some implementations, the generative AI model 28 determines a context 30 of the facility 102 in response to the generative AI model 28 analyzing the sensor data 16. In some implementations, the context 30 identifies a context change in the facility 102. For example, the context change includes an anomaly detected, physical differences in equipment, or a hazardous condition.

At 306, the method 300 includes generating, by the generative AI model, an action in response to the context. The generative AI model 28 generates an action 32 in response to the context 30.

At 308, the method 300 includes outputting the action. The facility management application 26 outputs the action 32. In some implementations, the facility management application displays, on a user interface, a report with the context 30 and the action 32. In some implementations, the user 108 authorizes the action 32 using the user interface.

In some implementations, the facility management application 26 causes the action 32 to occur in the facility 102. In some implementations, the facility management application 26 provides instructions with tasks 34 for a robot 20 in the facility 102 to perform the action 32. For example, the sensor data 16 is obtained from a robot 20 performing an inspection of equipment 18 in the facility 102 and the action 32 modifies the inspection being performed by the robot 20. In some implementations, the action 32 occurs in response to approval from the user 108. For example, the robot 20 in the facility 102 performs the action 32 in response to the user 108 selecting an icon on the user interface authorizing the action 32.

In some implementations, the facility management application 26 provides instructions for equipment 18 in the facility 102 to perform the action 32. For example, the action 32 includes instructions for the equipment 18 to shut off the power. In some implementations, the action 32 is performed by the equipment 18 in the facility 102 in response to the user 108 authorizing the action 32. For example, the user 108 selects the action 32 on the user interface and the facility management application 26 provides instructions to initiate the equipment 18 to shut off the power in response to the user 108 selecting the action 32.

In some implementations, the facility management application 26 provides instructions for a drone 24 in the facility 102 to perform the action 32. For example, the action 32 includes instructions to a drone 24 to fly over a location where the anomaly is detected to capture video of the location.

In some implementations, the facility management application 26 provides instructions for equipment 18 in the facility 102 to perform a first action 32, a robot 20 in the facility 102 to perform a second action 32, and a drone 24 in the facility 102 to perform a third action 32.

The method 300 aids in facility management by automatically determining a context of a facility 102 using the sensor data 16 and generating actions 32 to take in the facility 102 in response to the context 30.

Figure 4:
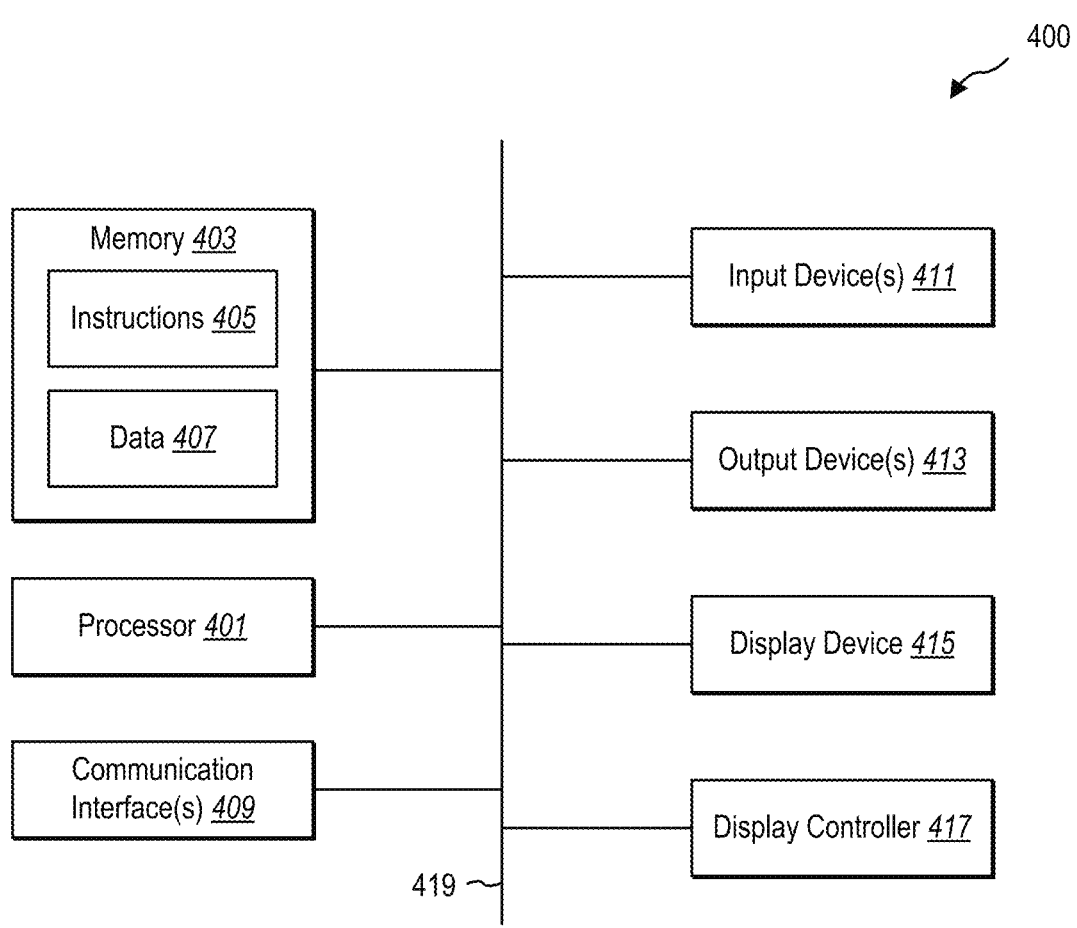
FIG. 4 illustrates components that may be included within a computer system in accordance with implementations of the present disclosure.

FIG. 4 illustrates components that may be included within a computer system 400. One or more computer systems 400 may be used to implement the various methods, devices, components, and/or systems described herein.

The computer system 400 includes a processor 401. The processor 401 may be a general-purpose single or multi-chip microprocessor (e.g., an Advanced RISC (Reduced Instruction Set Computer) Machine (ARM)), a special purpose microprocessor (e.g., a digital signal processor (DSP)), a graphics processing unit (GPU), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403 in electronic communication with the processor 401. The memory 403 may be any electronic component capable of storing electronic information. For example, the memory 403 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 405 and data 407 may be stored in the memory 403. The instructions 405 may be executable by the processor 401 to implement some or all of the functionality disclosed herein. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and light pen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

The various components of the computer system 400 may be coupled together by one or more buses, which may include a power bus, a control signal bus, a status signal bus, a data bus, etc. For the sake of clarity, the various buses are illustrated in FIG. 4 as a bus system 419.

In some implementations, the various components of the computer system 400 are implemented as one device. For example, the various components of the computer system 400 are implemented in a mobile phone or tablet. Another example includes the various components of the computer system 400 implemented in a personal computer. Another example includes the various components of the computer system 400 implemented in the cloud. Another example includes the various components of the computer system 400 implemented on an edge device.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model, a probabilistic graphical model) that can be tuned (e.g., trained) based on training input to approximate unknown functions. For example, a machine learning model may refer to a neural network (e.g., a convolutional neural network (CNN), deep neural network (DNN), recurrent neural network (RNN), generative adversarial networks (GANs)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. There is no intention to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method comprising:
receiving, at an edge server, sensor data from sensors in a facility, wherein a sensor plug and play model executing at the edge server dynamically discovers the sensors in the facility;
determining a context of the facility in response to a generative artificial intelligence model at the edge server analyzing the sensor data;
generating, by the generative artificial intelligence model, an action in response to the context, wherein the action is a robot assisted inspection of equipment in the facility;
performing on-the-fly resource reservations of hardware and software to identify reserved resources at the edge server for performing the action;
using the reserved resources at the edge server in providing commands to a robot to perform the action;
determining a context change in the facility in response to the generative artificial intelligence model analyzing the sensor data, wherein the context change includes detection, by a sensor, of a pressure drop on a gauge on a pipeline; and
using the reserved resources in providing updated commands to the robot in response to the context change in the facility, wherein the updated commands include instructing the robot to search and check all gauges in a vicinity of the pipeline.

2. The method of claim 1, wherein the sensor data is multimodal data obtained from mobile location sensors and fixed location sensors in the facility.

3. The method of claim 2, wherein the mobile location sensors are on robots and drones associated with the facility.

4. The method of claim 1, wherein the sensor data is obtained from the robot performing the robot assisted inspection of the equipment in the facility and the action modifies the robot assisted inspection being performed by the robot.

5. The method of claim 1, wherein the context change in the facility includes a detected anomaly, physical differences in equipment, or a hazardous condition.

6. The method of claim 5, wherein the action further includes providing instructions to a drone to fly over a location where the anomaly is detected and the reserved resources provide commands to the drone to fly over the location and to capture video of the location.

7. The method of claim 1, further comprising:
displaying a report with the context and the action.

8. The method of claim 1, wherein using the reserved resources in providing the commands to the robot further includes dynamic spawning of services on heterogeneous hardware at the edge server.

9. The method of claim 1, wherein the gauge on the pipeline is connected to an exit of a compressor, and wherein the updated commands include instructing the robot to search and check all the gauges in a vicinity of the compressor.

10. A device, comprising:
a memory to store data and instructions; and
a processor operable to communicate with the memory, wherein the processor is operable to:
receive, at an edge server, sensor data from sensors in a facility, wherein a sensor plug and play model executing at the edge server dynamically discovers the sensors in the facility;
determine a context of the facility in response to a generative artificial intelligence model at the edge server analyzing the sensor data;

generate, by the generative artificial intelligence model, an action in response to the context;

perform on-the-fly resource reservations of hardware and software to identify reserved resources at the edge server for performing the action;

use the reserved resources at the edge server in providing commands to equipment in the facility to perform the action;

determine a context change in the facility in response to the generative artificial intelligence model analyzing the sensor data, wherein the context change includes a hazardous condition; and use the reserved resources in providing updated commands to the equipment in response to the context change in the facility, wherein the updated commands instruct the equipment to perform an emergency shutdown of the equipment.

11. The device of claim 10, wherein the sensor data is multimodal data obtained from mobile location sensors and fixed location sensors in the facility.

12. The device of claim 11, wherein the mobile location sensors are on robots and drones associated with the facility.

13. The device of claim 10, wherein the processor is further operable to obtain the sensor data from a robot performing an inspection of the equipment in the facility.

14. The device of claim 10, wherein the context identifies a-context change in the facility includes a detected anomaly or physical differences in equipment.

15. The device of claim 14, wherein the action further includes providing instructions to a drone to fly over a location where the anomaly is detected to capture video of the location.

16. The device of claim 10, wherein the processor is further operable to display, on a user interface, a report with the context and the action.

17. The device of claim 10, wherein the processor is further configured to dynamically spawn services on heterogeneous hardware at the edge server to use in providing the commands to the equipment in the facility to perform the action.

18. A non-transitory computer-readable storage medium including instructions that, when executed by a processor, cause the processor to:

receive, at an edge server, sensor data from sensors in a facility, wherein a sensor plug and play model executing at the edge server dynamically discovers the sensors in the facility;

determine a context of the facility in response to a generative artificial intelligence model at the edge server analyzing the sensor data;

generate, by the generative artificial intelligence model, an action in response to the context, wherein the action is a robot assisted inspection of equipment in the facility;

perform on-the-fly resource reservations of hardware and software to identify reserved resources at the edge server for performing the action;

use the reserved resources at the edge server in providing commands to a robot to perform the action, wherein using the reserved resources at the edge server includes dynamic spawning of services on heterogeneous hardware at the edge server;

determine a context change in the facility in response to the generative artificial intelligence model analyzing the sensor data, wherein the context change includes detection, by a sensor, of a hydrogen sulfide gas concentration above a normal value; and use the reserved resources in providing updated commands to the robot in response to the context change in the facility, wherein the updated commands include re-routing a path of the robot to search for a cause of the hydrogen sulfide gas concentration above the normal value.

* * * * *